United States Patent [19]

Butman, Jr. et al.

[11] Patent Number: 4,473,765

[45] Date of Patent: Sep. 25, 1984

[54] ELECTROSTATIC GRADING LAYER FOR THE SURFACE OF AN ELECTRICAL INSULATION EXPOSED TO HIGH ELECTRICAL STRESS

[75] Inventors: Thomas R. Butman, Jr., Albany; Alexander L. Lynn, Duanesburg; Kevork A. Torossian, Schenectady, all of N.Y.

[73] Assignee: General Electric Company, Schenectady, N.Y.

[21] Appl. No.: 429,715

[22] Filed: Sep. 30, 1982

[51] Int. Cl.³ .................. H02K 3/34; H02K 15/12
[52] U.S. Cl. .................. 310/215; 310/45; 174/127; 428/331; 428/477.7; 428/698
[58] Field of Search .................. 310/196, 215, 45; 174/127; 428/331, 698, 477.7

[56] References Cited

U.S. PATENT DOCUMENTS

| | | | |
|---|---|---|---|
| 1,783,837 | 12/1930 | Freiburghouse | 310/196 |
| 2,613,238 | 10/1952 | Wieseman | 310/196 |
| 2,789,154 | 4/1957 | Peterson | 174/73 |
| 2,939,976 | 6/1960 | Manni | 310/196 |
| 3,066,180 | 11/1962 | Virsberg et al. | 174/127 |
| 3,210,461 | 10/1965 | Berg et al. | 174/127 |
| 3,354,331 | 11/1967 | Broeker et al. | 310/196 |
| 3,670,192 | 6/1972 | Andersson et al. | 310/196 |
| 3,679,925 | 7/1972 | Fort | 310/196 |
| 3,723,797 | 3/1973 | Andersson et al. | 310/196 |
| 3,975,653 | 8/1976 | Kawakami et al. | 310/196 |
| 4,207,482 | 6/1980 | Neumeyer et al. | 310/196 |

Primary Examiner—William R. Dixon, Jr.
Attorney, Agent, or Firm—John F. Ahern; Paul Checkovich

[57] ABSTRACT

A grading layer for a slot armor in an electric machine employs a layer of semi-conducting particles of silicon carbide bonded to the face of insulation of the slot armor. A layer of a tough high temperature paper such as an aramid paper separates the silicon carbide from the windings. The voltage gradient at the radially outerward extremity of the windings is capacitively coupled through the aramid paper to the silicon carbide layer wherein span-wise conduction decreases the peak voltage gradient to reduce the likelihood of the formation of corona and flashover.

4 Claims, 3 Drawing Figures

ELECTROSTATIC GRADING LAYER FOR THE SURFACE OF AN ELECTRICAL INSULATION EXPOSED TO HIGH ELECTRICAL STRESS

BACKGROUND OF THE INVENTION

The present invention relates to electrical machines and, more particularly, to machines in which high electrical stress can be generated on a surface of an insulator in the vicinity of an electrical conductor.

In a high-powered electrical apparatus such as, for example, the rotor of an electric generator, it is customary to produce slots in the surface of the generally cylindrical rotor into which field windings may be placed. In large machines, such slots may extend generally parallel to the axis of the rotor for 20 or 30 feet. Such field windings are energized during operation to produce electricity when the rotor is driven.

The rotor forging itself is generally maintained at ground potential whereas the coils or windings in the slots are maintained at relatively high potential. In order to protect against arcing from the windings to the rotor forging and also to protect against physical abrasion of the windings, it is customary to employ a slot armor lining the sides and bottom of the slot. Such slot armor is conventional and may consist of, for example, a fabric laid up from woven or non-woven glass fibers impregnated with a resin and cured by conventional means.

It is known that a high electrostatic gradient is produced at the radially outermost region of the windings adjacent to the slot armor lining the sides of the slot. This electrostatic gradient may be sufficient to produce ionization of the gaseous medium near the surface of the slot armor and thus initiate arcing along the armor surface which bridges the insulating path from the winding to the grounded rotor forging.

This problem has been recognized and met in the past by applying a grading layer to the surface of the slot armor facing the windings. The grading layer has a resistivity intermediate between that of a good insulator, in the range of $10^{12}$ ohms per square or more and that of a good conductor having a resistivity of $10^{-1}$ ohms per square or less. Such a semi-conducting material permits a limited amount of span-wise distribution of electrical charge so that the sharpness of the electrostatic gradient and consequently the likelihood of the production of a corona followed by flashover is reduced.

One type of semi-conducting material which has been in commercial use for some time is asbestos which has been applied to the surface of the slot armor. Asbestos, having a resistivity of about $10^8$ ohms per square and being substantially fire resistant, has performed satisfactorily in this use. The use of asbestos is no longer favored due to the possibility that it may have an adverse effect on human health.

Other types of grading materials have included a plastic material containing conducting materials, such as disclosed in U.S. Pat. No. 2,789,154 or layers of metal foil embedded within an insulating medium as disclosed in U.S. Pat. No. 2,939,976.

Certain classes of semi-conducting materials have non-linear resistance characteristics in the presence of high voltage. One such non-linear semi-conducting material is silicon carbide (SiC). In the presence of a relatively low voltage gradient, silicon carbide has a relatively high resistivity. When exposed to a high voltage gradient, on the order of, for example, several thousand volts per inch, the resistivity of silicon carbide is substantially reduced. This effect has been employed in a ceramic version of silicon carbide for lightning suppression. The use of silicon carbide in a grading system has been disclosed in U.S. Pat. Nos. 3,066,180 and 3,210,461.

Another disclosure of the use of non-linear resistive effects is to be found in U.S. Pat. No. 3,670,192 which employs a conducting layer on the ends of coils which is connected to ground through a variable non-linear resistor.

Silicon carbide, although having desirable non-linear resistance characteristics in the proper range for use in a grading system, is well known for being a very hard abrasive material. If a silicon carbide layer were incorporated in the surface of a slot armor contacting the windings, abrasion of the windings is likely to occur during motion of the windings under electrical and thermal stress.

OBJECTS AND SUMMARY OF THE INVENTION

Accordingly, it is an object of the present invention to provide a grading layer which overcomes the drawbacks of the prior art.

It is a further object of the invention to provide a grading layer which does not require the use of asbestos.

It is a further object of the invention to provide a grading layer for the surface of an insulating slot armor wherein the grading layer has a non-linear resistance characteristic in the presence of a voltage gradient.

It is a further object of the invention to provide a grading layer employing silicon carbide wherein the silicon carbide is physically separated from the associated coil windings.

It is a further object of the invention to provide a grading layer for a slot armor which employs an electrically continuous layer of silicon carbide particles coated on one side of a tough high temperature paper which is bondable to the surface of a slot armor insulating layer during fabrication of the slot armor insulating layer.

According to an aspect of the present invention, there is provided a grading layer for a slot armor of an electric machine, of the type having electrical windings in a slot, comprising an outer layer of an inert web having a first side facing the windings, a layer of semi-conducting material on a second side of the inert web, and means for bonding the grading layer to the slot armor.

According to a further aspect of the present invention, there is provided a slot armor for an electric machine of the type having electrical windings in a slot, comprising an insulating layer lining the slot, a grading layer covering a surface of the insulating layer facing the windings, the grading layer including a first layer of semi-conducting material adhered to the insulating layer and a second layer of a web on the first layer, the web being contiguous to the windings, the semi-conducting material being silicon carbide powder in a cured resin, and the web being an aramid paper.

According to a feature of the present invention, there is provided a method of forming a slot armor with a grading layer on a surface thereof, comprising coating a first surface of a web of aramid paper with a uniform mixture of semi-conducting particles in a first heat curable resin, drying the mixture, laying up the coated web on a first mold plate with a second uncoated surface of the aramid paper in contact with the first mold plate and the first surface facing away from the first mold plate, laying at least one layer of a fabric pre-impregnated with a second heat curable resin in contact with the first surface, the first and second heat curable resins being mutually compatible and being curable under the same conditions of time and temperature, placing a second mold plate in contact with the at least one layer of a fabric, and curing the first and second resins while forming the slot armor between the first and second mold plates.

According to a further feature of the present invention, there is provided a method of reducing high voltage gradients at a surface of an insulator comprising placing an insulating layer contiguous to the surface and capacitively coupling an electrostatic field through the insulating layer to a semi-conducting layer at an interface between the insulator and the insulating layer, the semi-conducting layer being effective to reduce the voltage gradients.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
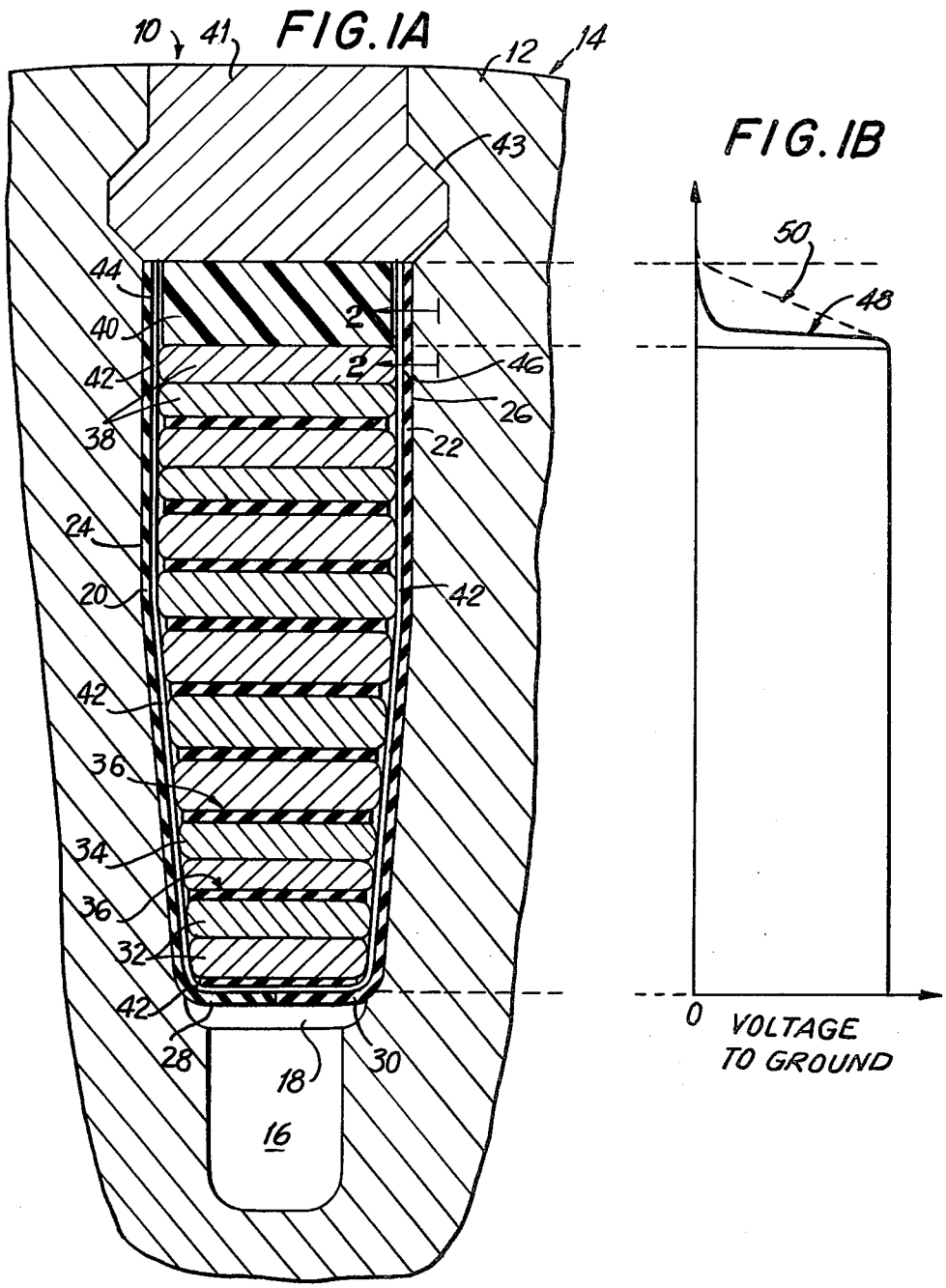
FIG. 1A is a cross section of a slot in a generator stator containing a slot armor having a grading layer according to an embodiment of the invention.
FIG. 1B is a plot of voltage along the surface of a slot armor of FIG 1A.

Referring to FIG. 1A, there is shown a cross section of a slot 10 in a rotor 12 of a dynamo electric machine. Rotor 12 is a metal forging and is normally maintained at ground potential.

Windings of conventional rotors 12 in generating equipment are customarily cooled by flowing gas therethrough at atmospheric or elevated pressures. In some generators, cooling air at atmospheric pressure enters the slots and flows radially past the windings. In other systems, flowing hydrogen gas at elevated pressure such as, for example, about 45 to 75 psig provides the cooling. Although for a given pressure, air resists corona and flashover at higher voltages than does hydrogen, pressurization of the hydrogen maintains the flashover and corona voltage in an acceptable range when used in conjunction with the present invention. Since full disclosure of gas cooling and the apparatus for circulating the gas through the windings is described in issued patents, a detailed description of them is omitted.

Slot 10 extends radially inward from a tangential surface 14 of rotor 12 and customarily extends in an axial direction from one end of rotor 12 to the other. In a large generator, this length dimension of rotor 12 may be quite great such as, for example, 14 to 27 feet or more.

An insulating bottom cover 18 is laid at a bottom 16 of slot 10. Bottom cover 18 is preferably of an insulating material such as, for example, a glass fiber matrix in a cured resin. A pair of generally L-shaped insulating slot armor elements 20 and 22 line the sides 24 and 26 continuously along the full length of slot 10 with short arms 28 and 30 facing each other and preferably touching.

A first winding 32 rests in the bottom of the cavity formed by slot armor elements 20 and 22. An insulating layer 36 is interposed between winding 32 and a next winding 34. Insulating layer 36 may be of any convenient material such as, for example, a conventional polyester glass insulation.

The remainder of slot 10 is filled with alternating windings and insulating layers to a last, or radially outermost winding 38. Finally, a creepage block 40 consisting of a glass fiber matrix in a cured resin binder covers the top of slot 10 above radially outermost winding 38.

A machined metal wedge 41 is inserted into dovetails 43 in the sides of slot 10 to hold the aforementioned parts in place against the large centrifugal force they experience during rotation of rotor 12.

A grading layer 42 lines the inner surfaces 44 and 46 of slot armor elements 20 and 22, respectively.

Along the radial extent of slot 10, very little voltage gradient is experienced at inner surfaces 44 and 46 of slot armor elements 20 and 22 except in the vicinity of the radially outer portion of radially outermost winding 38 adjacent to slot armor elements 20 and 22. In this region, a relatively high voltage gradient occurs due to the discontinuity in voltage. That is, in the vicinity of the windings within slot 10, a relatively high but relatively uniform voltage exists. However, radially beyond radially outermost winding 38, the voltage drops to zero. In this region of sharp voltage change, a severe voltage gradient can occur.

Referring to FIG. 1B, the voltage with respect to ground along the inner surface 44 or 46 of the slot armor elements 20 or 22 is shown. In the absence of the grading layer, the voltage gradient is steep, as represented by the solid line 48 and its value may exceed the critical gradient for flashover of the surrounding gas in which case damaging corona may be produced. This is particularly true during high voltage proof testing when overvoltage, several times the level of operating voltage, is applied to the winding. Addition of the grading layer 42 in FIG. 1A changes the span-wise distribution of voltage due to the non-linear characteristics of the grading material such that voltage gradients are reduced to an acceptable level as shown by the dashed line 50. It would be clear to one skilled in the art that the higher voltage gradient 48 produced in the absence of a grading layer would have a greater tendency to produce a corona and strike a leakage path than would the less steep voltage gradient 50 produced with a grading layer.

Figure 2:
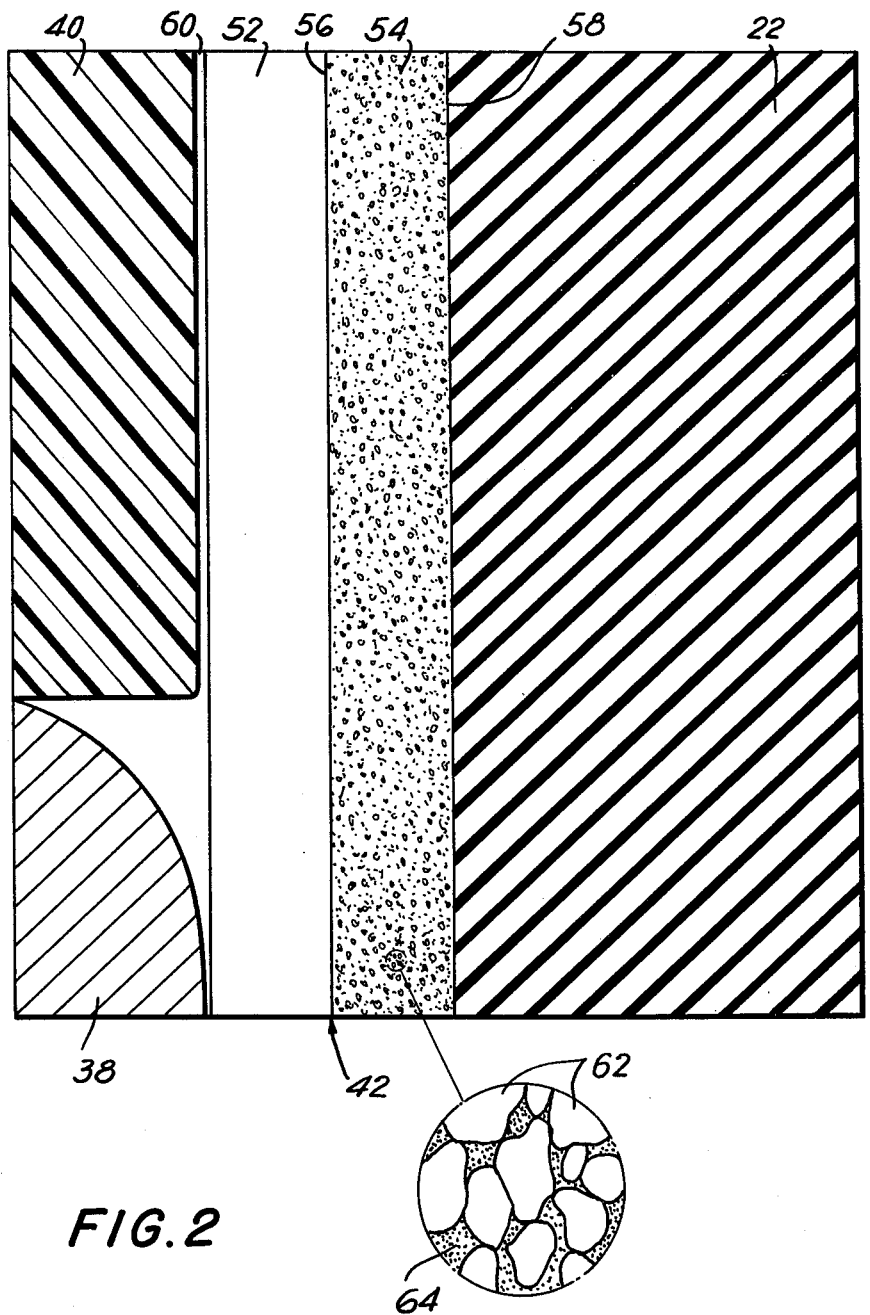
FIG. 2 is a cross section of a grading layer and a portion of slot armor insulation taken along II—II of FIG. 1A.

Referring now to FIG. 2, grading layer 42 is seen to consist of an outer layer 52 of a smooth, hard, tough, flexible material capable of withstanding elevated temperature without charring. One suitable material for this application is an aramid paper produced by the Dupont Corporation under the trademark Nomex. A uniform dense layer 54 of silicon carbide powder is bonded to the rear surface 56 of outer layer 52. Layer 54 is bonded to the insulating body of slot armor element 22 along a bond line 58. An outer surface 60 of outer layer 52 faces the windings in slot 10 (FIG. 1A).

Referring to the inset in FIG. 2, silicon carbide particles 62 are bonded in a cured plastic matrix 64 so that sufficient electrical contact is achieved between adjacent particles 62 to make layer 54 electrically continuous.

Although layer 54 is shown bonded to slot armor element 22 along a bond line 58, layer 54 and slot armor element 22 contain compatible resins such as, for example, epoxy resins, which are cured during the final stages of the formation of slot armor element 22 and, in fact, unite to produce uniform fusion therebetween without voids and other discontinuities which could permit the buildup of voltage stress and subvert the action of grading layer 42.

It would be clear to one skilled in the art that, since layer 54, containing the semi-conducting silicon carbide, is separated from the windings in slot 10 by an insulating aramid paper, direct physical contact cannot be relied on for coupling charges from the windings to layer 54. Thus, capacitive coupling must be relied on to couple the field strength from the windings to layer 54 wherein the charges are resistively dissipated and spread in a span-wise direction to reduce the voltage gradient.

The resin systems of slot armors 20 and 22 and the grading layer 42 are chosen to be compatible, that is, they cure under the same time and temperature conditions, final adhesion between them is good and neither inhibits the cure of the other. Further, the resin formulations and surrounding materials are such that the grading material particles remain in electrical contact with each other and are not dispersed while resin materials are in a liquid state during the curing process. The armor material complete with grading layer 42 is molded between L-shaped mold plates, after being laid up between them with appropriate mold release materials between the armor and the plates, in a sealed apparatus such as an autoclave in which appropriate conventional vacuum and a pressure/temperature cycles can be applied.

The insulation portions of slot armor elements 20 and 22 are preferably built up using several plies of glass fiber and most preferably plies of non-woven glass fiber. In the preferred embodiment, a layer of cross ply non-woven pre-preg glass fiber is laid atop grading layer 42. A further layer of unidirectional non-woven pre-preg glass fiber cloth is laid over the first layer and a final layer of cross ply non-woven pre-preg glass fiber cloth is laid up over the unidirectional layer. Non-woven glass fiber is preferred for maximum strength in this application.

It would be clear that the layup process is not limited to the above sequence in which grading layer 42 is placed in position first. Instead, the reverse sequence can be used in which the sandwich is formed with grading layer 42 on top.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A grading layer for a molded slot armor of an electric machine, of the type having electrical windings in a slot, comprising:
   an inert web of aramid paper having a first side disposable in said slot adjacent said windings;
   a layer of a silicon carbide powder in a resin binder on a second side of said inert web;
   said resin binder being effective for bonding said grading layer to said slot armor and;
   said aramid paper having a sufficient smoothness on at least said second surface effective to permit curing of said resin binder while maintaining said silicon carbide powder distributed substantially uniformly and electrically continuous.

2. A grading layer according to claim 1, wherein said resin binder includes a first heat curable resin, said slot armor including a second heat curable resin, said first and second heat curable resins being compatible with each other and curable to a unitary mass under the same conditions of time and temperature during fabrication thereof.

3. A grading layer according to claim 1, wherein an electric field from said windings is capacitively coupled through said inert web to said layer of silicon carbide powder.

4. A slot armor for an electric machine of the type having electrical windings in a slot, comprising:
   an insulating layer lining said slot;
   a grading layer covering a surface of said insulating layer facing said windings;
   said grading layer including a first layer of semi-conducting material adhered to said insulating layer and a second layer of a web on said first layer, said web being contiguous to said windings;
   said semi-conducting material being silicon carbide powder in a cured resin;
   said web being an aramid paper; and
   said aramid paper having a sufficient smoothness on at least a surface contacting said grading layer effective to permit curing of said resin while maintaining said silicon carbide powder distributed substantially uniformly and electrically continuous.

* * * * *